(12) United States Patent
Tsuda et al.

(10) Patent No.: US 10,097,130 B2
(45) Date of Patent: Oct. 9, 2018

(54) ENERGIZATION CONTROL SYSTEM AND SENSOR UNIT

(71) Applicant: AISIN SEIKI KABUSHIKI KAISHA, Kariya-shi, Aichi-ken (JP)

(72) Inventors: Mamoru Tsuda, Nagoya (JP); Ken Okumura, Hekinan (JP); Hiromu Kinoshita, Kariya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 14 days.

(21) Appl. No.: 15/364,542

(22) Filed: Nov. 30, 2016

(65) Prior Publication Data

US 2017/0163204 A1 Jun. 8, 2017

(30) Foreign Application Priority Data

Dec. 2, 2015 (JP) .................................. 2015-235842
Oct. 28, 2016 (JP) .................................. 2016-211303

(51) Int. Cl.
*H02P 29/68* (2016.01)
*H02P 27/06* (2006.01)

(52) U.S. Cl.
CPC ............ *H02P 29/685* (2016.11); *H02P 27/06* (2013.01)

(58) Field of Classification Search
CPC ........ H02P 29/68; H02P 29/685; H02P 29/60; H02K 11/25; H02K 29/08; H01B 7/324; G01K 1/165; G01K 7/00; G01K 7/38; G01R 15/185; G01R 33/0011; G01R 33/02; G01R 33/24; G01R 33/0082; G01R 31/3675; G01R 21/14; G01R 19/32
See application file for complete search history.

(56) References Cited

U.S. PATENT DOCUMENTS

| | | | |
|---|---|---|---|
| 2003/0057914 A1* | 3/2003 | Kamatsu ............. | B60L 11/1803 318/727 |
| 2014/0253109 A1* | 9/2014 | Singh ................... | G01R 15/181 324/227 |
| 2015/0263649 A1* | 9/2015 | Omura ................... | H02P 6/085 318/472 |

(Continued)

FOREIGN PATENT DOCUMENTS

| | | |
|---|---|---|
| JP | 2009-171702 A | 7/2009 |
| JP | 2012-018081 A | 1/2012 |

(Continued)

*Primary Examiner* — Bickey Dhakal
(74) *Attorney, Agent, or Firm* — Sughrue Mion, PLLC

(57) ABSTRACT

An energization control system includes a sensor unit including a magnetic detection portion detecting a magnetic flux density of a magnetic flux generated at a surrounding of a conductor in response to a current flowing in the conductor of an electrical apparatus, a temperature detection portion detecting a temperature level within a package in which the magnetic detection portion is disposed, a correction portion correcting a temperature characteristic of a detection result of the magnetic detection portion based on the detected temperature level, and an output portion outputting temperature information indicating the detected temperature level. The energization control system further includes a control unit including a control portion controlling a current flowing in a heating element of the electrical apparatus based on the temperature information.

7 Claims, 3 Drawing Sheets

(56) References Cited

U.S. PATENT DOCUMENTS

2016/0146860 A1* 5/2016 Futakuchi ............ G01R 15/207
　　　　　　　　　　　　　　　　　　324/105

FOREIGN PATENT DOCUMENTS

| JP | 2013-048515 A | 3/2013 |
| JP | 2013-054016 A | 3/2013 |
| JP | 2016-111167 A | 6/2016 |

* cited by examiner

| I[A] | Temperature indicated by temperature information | Temperature increase value of switching element |
|---|---|---|
| A1 | Ta1 | Tb1 |
| A2 | Ta2 | Tb2 |
| A3 | Ta3 | Tb3 |
| A4 | Ta4 | Tb4 |
| A5 | Ta5 | Tb5 |

ENERGIZATION CONTROL SYSTEM AND SENSOR UNIT

CROSS REFERENCE TO RELATED APPLICATIONS

This application is based on and claims priority under 35 U.S.C. § 119 to Japanese Patent Applications 2015-235842, filed on Dec. 2, 2015, and 2016-211303, filed on Oct. 28, 2016, the entire content of which is incorporated herein by reference.

TECHNICAL FIELD

This disclosure generally relates to an energization control system and a sensor unit.

BACKGROUND DISCUSSION

A known voltage converter and a known inverter have been used when driving a three-phase motor. The voltage converter boosts an input voltage to a predetermined voltage. The inverter changes a frequency of an output of the voltage converter. Meanwhile, plural switching elements are provided at the voltage converter and the inverter. The switching elements self-heat by energization, and electrical characteristics and a rating are specified in response to an ambient temperature level of the switching elements. Here, the ambient temperature is desired to be considered upon the use of the switching elements. The technology in which the switching elements are used under the consideration of the ambient temperature is disclosed in JP2013-48515A (hereinafter referred to as Patent reference 1).

An electric automobile disclosed in Patent reference 1 is provided with an inverter supplying electric power to a three-phase motor. The inverter includes plural switching elements. The electric automobile is provided with a temperature sensor, a current sensor, and a voltage sensor. The temperature sensor measures a temperature level of a refrigerant cooling the switching elements. The current sensor measures an output current of the inverter. The voltage sensor measures an input voltage inputted to the inverter. A temperature correction value is calculated based on a measurement data of the current sensor per switching element, a measurement data of the voltage sensor per switching element, and a duty ratio of the switching element. The temperature correction value is added to a measurement result of the temperature level of the refrigerant to estimate the temperature level of the switching elements.

According to a device disclosed in Patent reference 1, detection results of the plural sensors are used to estimate the temperature level of the switching elements. In this case, because the detection results include errors of measurement, the errors of measurement included in the estimate results of the temperature levels of the switching elements may be increased. Accordingly, when the switching elements are energized, the electric characteristics and the rating are desired to include margins. Accordingly, the device disclosed in Patent reference 1 may not be able to fully use a capability of the switching elements.

A need thus exists for an energization control system and a sensor unit which is not susceptible to the drawback mentioned above.

SUMMARY

According to an aspect of this disclosure, an energization control system includes a sensor unit including a magnetic detection portion detecting a magnetic flux density of a magnetic flux generated at a surrounding of a conductor in response to a current flowing in the conductor of an electrical apparatus, a temperature detection portion detecting a temperature level within a package in which the magnetic detection portion is disposed, a correction portion correcting a temperature characteristic of a detection result of the magnetic detection portion based on the detected temperature level; and an output portion outputting temperature information indicating the detected temperature level. The energization control system further includes a control unit including a control portion controlling a current flowing in a heating element of the electrical apparatus based on the temperature information.

According to another aspect of this disclosure, a sensor unit includes a first output terminal outputting a detection result of a magnetic detection portion detecting a magnetic flux density of a magnetic flux being generated at a surrounding of a conductor in which a current flows, a second output terminal being used for a correction of a temperature characteristic of the detection result of the magnetic detection portion, the second output terminal outputting a detection result of a temperature detection portion detecting a temperature level within a package in which the magnetic detection portion is disposed, and a pair of positive and negative power supply terminals energizing the magnetic detection portion and the temperature detection portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
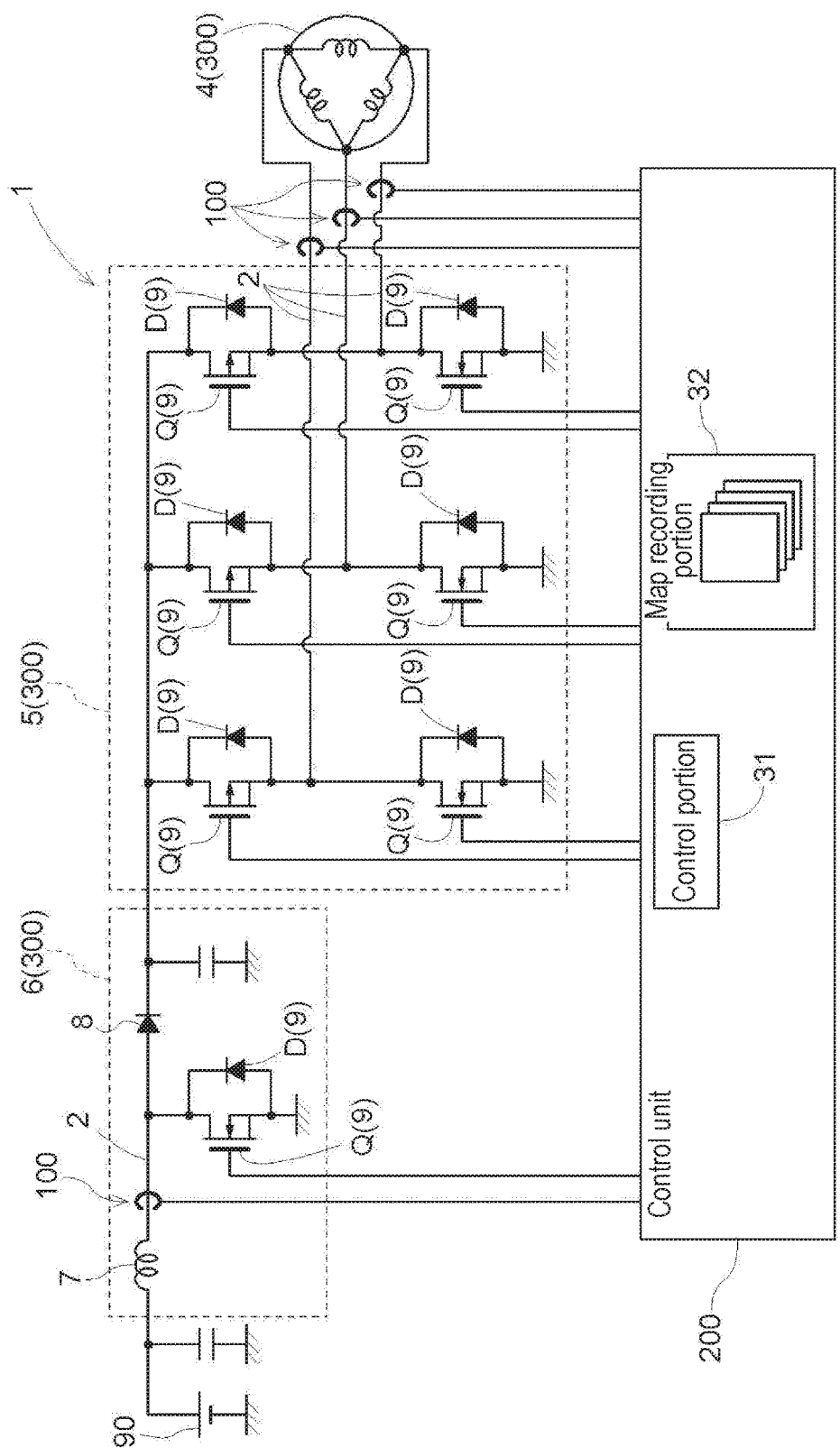
FIG. 1 is a block diagram schematically illustrating a structure of an energization control system according to an embodiment disclosed here.

An energization control system 1 and a sensor unit 100 of an embodiment will hereunder be explained. As shown in FIG. 1, the energization control system 1 includes the sensor unit 100 and a control unit 200.

The sensor unit 100 measures a measured current flowing in a conductor 2 and a temperature level of the sensor unit 100. Here, in a case where the current flows in the conductor 2, a magnetic field is generated about the conductor 2 in response to a magnitude of the current, and generates a magnetic flux. The sensor unit 100 detects the magnetic flux density of the magnetic field and measures the current (the current value) flowing in the conductor 2 based on the detected magnetic flux density.

Figures 2, 3:
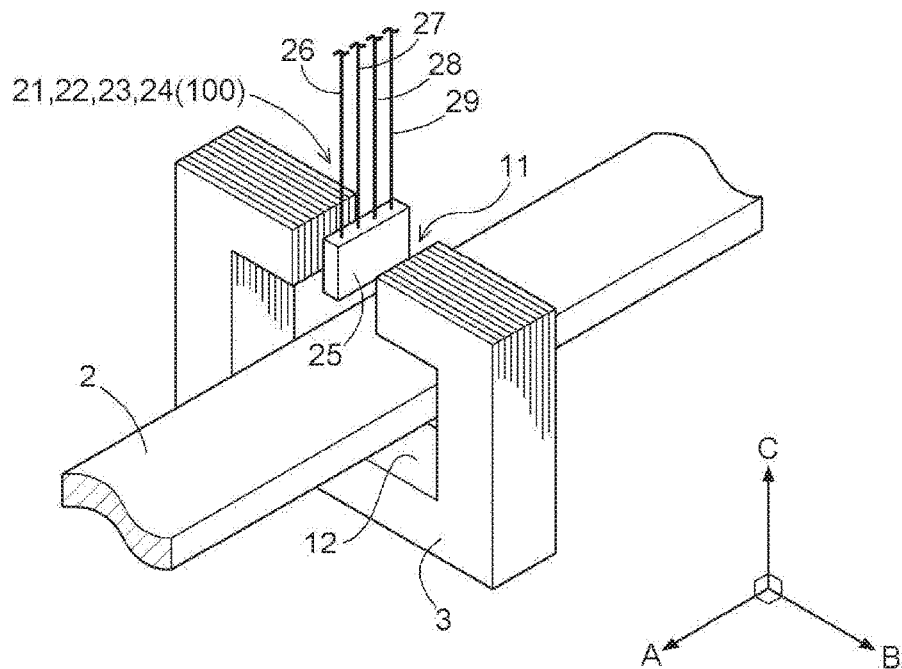
FIG. 2 is a view schematically illustrating a structure of a sensor unit.
FIG. 3 is a view illustrating an example of a map data recorded on a map.

FIG. 2 illustrates a perspective view of the sensor unit 100. To facilitate the understanding, an extending direction of the conductor 2 in which the measured current flows corresponds to a direction A, and directions orthogonal to the direction A correspond to directions B, C, respectively.

Here, the conductor 2 is provided so as to be provided in an annular core 3. A frequency converter 5 (see FIG. 1) converts at least one of an electric power inputted to a three-phase rotary electric machine 4 (see FIG. 1) and an electric power outputted from the three-phase rotary electric machine 4. The conductor 2 is used as a bus bar electrically connecting the three-phase rotary electric machine 4 to the frequency converter 5. In FIG. 1, as an example, a three-phase motor is illustrated as the three-phase rotary electric machine 4. Accordingly, the frequency converter 5 corresponds to an inverter converting a direct-current power, or a DC power that is output from, for example, a battery 90, into an alternating-current power, or an AC power. The conductor 2 supplies the voltage and the current converted into the AC power by the inverter to the three-phase motor. Accordingly, the sensor 100 measures the currents flowing in the plural conductors 2.

The conductor 2 is connected to an output terminal of an inductor 7 of a voltage converter 6 in series, the voltage converter 6 that boosts and outputs a predetermined input voltage. The predetermined input voltage corresponds to a voltage outputted from the battery 90. The voltage converter 6 corresponds to a DC-to-DC converter boosting the voltage by a chopper method. The conductor 2 connects the inductor 7 to a diode 8 of the voltage converter 6 in series.

In FIG. 2, the core 3 is made from a magnetic body and includes an opening part 11 that is disposed at a part of the annular body of the core 3. The core 3 of the embodiment is formed with plural flat plates. The flat plate is made from a metal-made magnetic body including a groove portion 12. The flat plates are stacked with one another in the direction A in FIG. 1. The metal-made magnetic body corresponds to a soft magnetic metal and corresponds to a magnetic steel plate (a silicon steel plate) or a permeability alloy. For example, a non-oriented magnetic steel plate may be used for such magnetic body. Alternatively, other magnetic steel plates may be used. Such metal magnetic body is stamped out to form the core 3. The conductor 2 is provided in the groove portion 12 of the core 3. Accordingly, the magnetic flux generated at a surrounding of the conductor 2 may be easily collected at the core 3.

The sensor unit 100 is provided at the opening part 11 of the groove portion 12. The sensor unit 100 includes a magnetic detection portion 21, a temperature detection portion 22, a correction portion 23, and an output portion 24. The magnetic detection portion 21 detects the magnetic flux density of the magnetic flux generated at the surrounding of the conductor 2 in response to the current flowing in the conductor 2 of an electrical apparatus 300. The electrical apparatus 300 corresponds to the three-phase motor as the three-phase rotary electric machine 4, to the inverter as the frequency converter 5, and to the DC-to-DC converter or as the voltage converter 6. The magnetic detection portion 21 detects the magnetic flux density generated at the opening part 11 of the groove portion 12. A known Hall integrated circuit (Hall IC) or a magneto-resistance effect element, or a MR element may be used for the magnetic detection portion 21.

The temperature detection portion 22 detects the temperature level within a package 25 in which the magnetic detection portion 21 is disposed. The sensor unit 100 is provided such that the magnetic detection portion 21 is provided in a known mold. Accordingly, the package 25 in which the magnetic detection portion is disposed corresponds to the mold of the sensor unit 100. For example, in a case where the sensor unit 100 includes a case that has a predetermined size, the package 25 corresponds to such case. The temperature detection portion 22 is integrally provided with the magnetic detection portion 21 so as to detect the temperature level within the package 25. Specifically, because it is favorable that the temperature detection portion 22 detects the temperature level at the surrounding of the magnetic detection portion 21 within the package 25, it is favorable that the temperature detection portion 22 is disposed adjacent to the magnetic detection portion 21.

The correction portion 23 corrects temperature characteristics of detection results of the magnetic detection portion 21 based on the temperature level detected by the temperature detection portion 22. The Hall IC or the resistance effect element (the MR element) being used as the magnetic detection portion 21 includes a known temperature dependence on detection results. Accordingly, the detection result of the magnetic detection portion 21 varies in response to an environmental temperature level. In a case where the detection result of the magnetic detection portion 21 is desired to be precise, the amount of the temperature variance in response to an operation environmental temperature is desired to be corrected. The temperature characteristics specifying the temperature dependence of the magnetic detection portion 21 is prerecorded in the correction portion 23. The correction portion 23 corrects the detection result of the magnetic detection portion 21 in response to the temperature detected by the temperature detection portion 22 and to the temperature characteristics. Accordingly, the amount of temperature variance may be removed from the detection result of the magnetic detection portion 21 and the precise detection result may be used.

The output portion 24 outputs temperature information indicating a temperature detected by the temperature detection portion 22. The temperature information corresponds to an electrically-signaled detection result of the temperature detection portion 22.

The sensor unit 100 of the embodiment includes four terminals that correspond to a first output terminal 26, a second output terminal 27, and a pair of positive-negative power supply terminals 28, 29. The first output terminal 26 outputs a detection result of the magnetic detection portion 21. The second output terminal 27 outputs a detection result of the temperature detection portion 22 being used to correct the temperature characteristics of the detection results of the magnetic detection portion 21. The pair of power supply terminals 28, 29 corresponds to a positive-negative power supply terminals supplying the electric power to the magnetic detection portion 21 and the temperature detection portion 22. FIG. 2 illustrates the four terminals corresponding to the first output terminal 26, the second output terminal 27, the pair of power supply terminals 28, 29 that are disposed in the aforementioned order, however, the order is not limited to the aforementioned order.

The four terminals are connected to electrodes being provided on a substrate with a soldered joint. The first output terminal 26 and the second output terminal 27 are connected to the control unit 200 via the electrode of the substrate. The pair of the power supply terminals 28, 29 are connected to a power supply line being provided on the substrate. Alternatively, the four terminals may be connected to the control unit 200.

As shown in FIG. 1, the control unit 200 includes a control portion 31 controlling the current flowing in a heating element 9 of the electrical apparatus 300 in response to the temperature information. The electrical apparatus 300 corresponds to a three-phase motor, an inverter, and a DC-to-DC converter. The heating element 9 corresponds to a component that generates heat by the flow of the current. According to the embodiment, the heating element 9 corresponds to a switching element of the inverter, or a switching element of a DC-to-DC converter. Specifically, the heating element 9 corresponds to a transistor Q and a diode D of the inverter and the DC-to-DC converter.

In a case where the control portion 31 controls a current flowing in the three-phase motor, and in a case where the control portion 31 determines that the current values of the currents flowing in the bus bars are constantly continued for a predetermined time, or are continued in an approximately constant manner for a predetermined time, the control portion 31 specifies the bus bar in which the current flows, the current with the greatest value among the current value of the current flowing in the bus bars. According to the embodiment, three bus bars are provided. Accordingly, each of the bus bars includes the sensor unit 100 that transmits the detection result of the magnetic detection portion 21. The control unit 200 calculates the current value per bus bar by using the detection result of the magnetic detection portion 21. The calculation result is transmitted to the control portion 31.

For example, each of phase currents of the three-phase motor corresponds to a current that is formed in a sinewave including a predetermined phase difference with one another. However, in a case where the motor is locked (in a case where the motor cannot rotate), each of the phase currents comes to be the DC current (DC current including a predetermined pulsation) instead of the sinewave. Such state corresponds to the state where the current values of the currents flowing in the bus bars are constantly continued for the predetermined time. An example of a state where the motor is locked corresponds to a state where the vehicle cannot climb over high steps even trying to climb over, or a state where the vehicle comes to be in contact with an obstacle and cannot go further in a case where the three-phase motor is used as a power source of the vehicle.

Determination of the constant continuation of the current values of the currents flowing in the bus bars for the predetermined time may correspond to the continuation of a state where the difference between the maximum current value and the second-greatest current value of the current values of the currents flowing in the plural bus bars for a predetermined time from a certain point of time. The determination may also correspond to a continuation of the maximum current value, among the current value of the current flowing in the plural bus bars, for a predetermined time from a certain point of time, and within a preset range. In a case where the current value of the current flowing in each of the plural bus bars is determined to be constantly continued for a predetermined time, the control portion 31 specifies the bus bar in which the current with the greatest current value flows while the current value is constantly continued.

Next, the control portion 31 estimates a temperature increase value of the switching element controlling the current flowing in the specified bus bar based on the temperature information. The specified bus bar corresponds to a bus bar that flows the current with the greatest current value. The switching element controlling the current corresponds to the transistor Q flowing the current to the specific bus bar of the switching element of the inverter. The temperature increase value corresponds to a difference of the temperature that increases relative to a reference temperature level (for example, 25 degrees Celsius).

Here, the temperature detection portion 22 of the sensor unit 100 transmits the temperature information to the control portion 31. The temperature information corresponds to a temperature level within the package 25 of the sensor unit 100 (specifically, the temperature level at a position close to the magnetic detection portion 21). Accordingly, the switching element of the inverter and the sensor unit 100 are disposed so as to be close to each other, however, the temperature level of the switching element is not equal to the detection result of the temperature detection portion 22.

Thus, the control portion 31 prerecords a map illustrating a relationship between the prerecorded temperature information and the temperature increase value of the heating element 9. The temperature level of the heating element 9 is estimated based on the temperature information transmitted from the sensor unit 100. An example of the map is illustrated in FIG. 3. The map specifies the relationship between the temperature level and the temperature increase value of the switching element shown by the temperature information. It is favorable that the relationship may be obtained in advance by, for example, experiments, and may be recorded on a map recording portion 32 of the control unit 200 as a map. It is favorable that the control portion 31 estimates the temperature level of the heating element 9, that is, the switching element, by the use of the map and the detection result of the coolant temperature sensor measuring the temperature level of the coolant cooling the electrical apparatus 300.

Next, the control portion 31 controls the operation of the heating element 9 in response to the estimation result. That is, in a case where the estimated temperature increase value corresponds to equal to or greater than a preset value, a duty ratio of on-state of the switching element is limited. Accordingly, because the duty ratio of on-state of the switching element that is heated is decreased, the current flowing in the switching element may be reduced. Accordingly, the heating value of the switching element may be reduced.

Similarly, in a case where the control portion 31 controls the current flowing in the switching element of the DC-to-DC converter, the control portion 31 estimates the temperature increase value of the inductor 7 based on the temperature information. In case where the estimated temperature increase value corresponds to a value equal to or greater than the preset value, the duty ratio of on-state of the switching element is limited. In this case as well, it is favorable that the control portion 31 estimates the temperature increase value of the inductor 7 by using the map recorded in a map recording portion 32. In a case where the temperature increase value corresponds to a value equal to or greater than a preset value, because it is assumed that an excessive current is flowed to the transistor Q of the DC-to-DC converter, it is favorable that the control portion 31 controls the transistor Q to reduce the duty ratio of on-state. Accordingly, because the current flowing in the transistor Q may be reduced, the heating value of the transistor Q may be reduced.

Alternatively, when the temperature level, indicated by the temperature information, within the package 25 reaches a preset reference temperature level T1, the control portion 31 may control the flow of the current generating the magnetic flux having the magnetic flux density that serves as a detection target of the sensor unit 100 outputting the temperature information. The temperature information corresponds to information transmitted from the temperature detection portion 22 of the sensor unit 100, and corresponds to information indicating the temperature level (specifically, the temperature level of a portion in adjacent to the magnetic detection portion 21) within the package of the sensor unit 100. The control of the flow of the current generating the magnetic flux having the magnetic flux density that serves as the detection target of the sensor unit 100 outputting the temperature information corresponds to the control of the current value of the current flowing in the bus bar to decrease in a case where the sensor unit 100 detects the magnetic flux density of the magnetic flux that is generated in response to the current flowing in the bus bar, and corresponds to the control of the current value of the current flowing in the inductor 7 to decrease in a case where the sensor unit 100 detects the magnetic flux density of the magnetic flux that is generated in response to the current flowing in the conductor 7 of the DC-to-DC converter.

Accordingly, when the temperature level within the package 25, the temperature level indicated by the temperature information transmitted from the sensor unit 100 detecting the magnetic flux density of the magnetic flux that is generated in response to the current flowing in the bus bar, reaches the preset reference temperature level T1, the control portion 31 controls the switching element of the inverter to reduce the duty ratio of on-state. When the temperature level within the package 25, the temperature level indicated by the temperature information transmitted from the sensor unit 100 detecting the magnetic flux density of the magnetic flux that is generated in response to the current flowing in the inductor 7, reaches the preset reference temperature level, the control portion 31 controls the transistor Q of the DC-to-DC converter to reduce the duty ratio of on-state.

Figure 4:
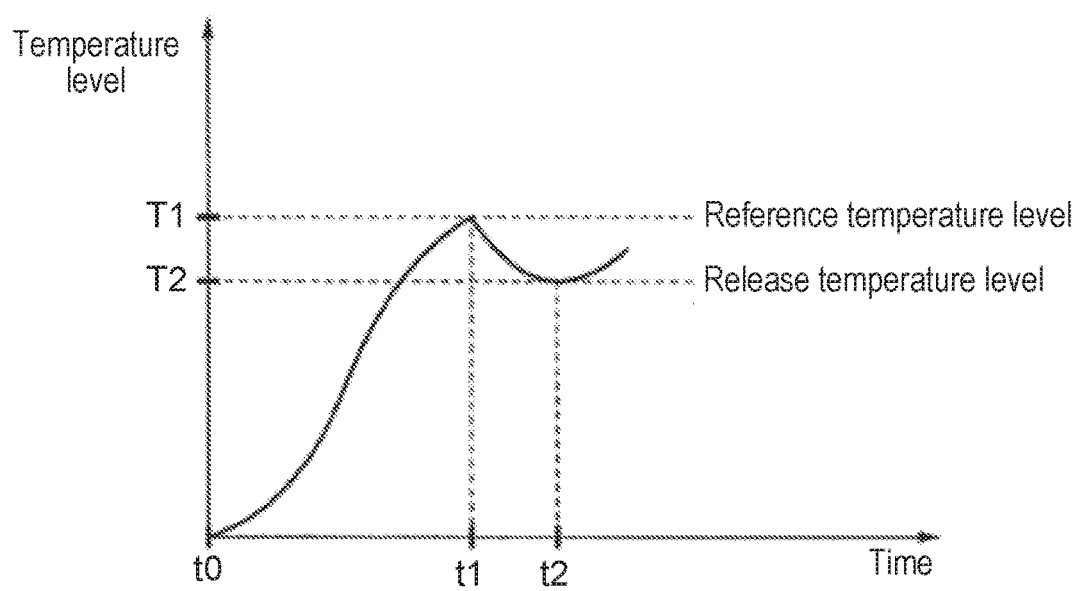
FIG. 4 is a view illustrating a change of a temperature level of a package.

FIG. 4 shows an example of the temperature level change within the package 25 in a case where the control portion 30 controls the current based on the temperature level within the package 25, the temperature level that is indicated by the temperature information. As shown in FIG. 4, as the magnetic detection portion 21 starts detecting the magnetic flux density at a time t0, the temperature level within the package 25 increases.

When the temperature level within the package 25 reaches the reference temperature level T1 serving as a threshold value at time t1, the control portion 31 controls the switching element to reduce the duty ratio of on-state, the switching element that serves a control target. Accordingly, the temperature level within the package 25 decreases by the control of the current value of the current to be decreased, the current that generates the magnetic flux having the magnetic flux density that corresponds to the detection target of the magnetic detection portion 21. At this time, as shown in FIG. 4, when the temperature level within the package 25 reaches the release temperature level (at time t2) serving as a predetermined temperature level T2 that is lower than the reference temperature level T1, the control portion 31 may release the control of the current. By the aforementioned hysteresis, the malfunction may be prevented.

A second embodiment will hereunder be explained. According to the first embodiment, the three-phase rotary electric machine 4 corresponds to a three-phase motor. Alternatively, the three-phase rotary electric machine 4 may correspond to an electric generator. In this case, the frequency converter 5 works as a rectifier circuit rectifying the electric power outputted from the electric generator. The switching element corresponds to a diode D. The disclosure may be applied to such a structure.

According to the embodiments, the voltage converter 6 corresponds to the boost DC-to-DC converter. Alternatively, the voltage converter 6 may correspond to a step-down DC-to-DC converter, an inverting DC-to-DC converter, or a buck boost DC-to-DC converter.

According to the embodiments, in a case where the control portion 31 controls the current flowing in the switching element of the inverter, the control portion 31 controls the switching element of the inverter to reduce the duty ratio of on-state when a presumed temperature increase value of the switching element of the inverter comes to be equal to or greater than a preset value. In a case where the control portion 31 controls the current flowing in the switching element of the DC-to-DC converter, the control portion 31 controls the switching element of the DC-to-DC converter to reduce the duty ratio of on-state when a presumed temperature increase value of the inductor 7 comes to be equal to greater than a preset value. The aforementioned preset values may be equal to each other, or may be different from each other (for example, the preset values may serve as a first preset value and a second preset value).

This disclosure may be applied to an energization control system controlling the energization of the heating element, and a sensor unit that may be used in the energization control system.

According to aforementioned embodiment, the energization control system (1) includes the sensor unit (100) including the magnetic detection portion (21) detecting the magnetic flux density of the magnetic flux generated at the surrounding of the conductor (2) in response to the current flowing in the conductor (2) of the electrical apparatus (300), the temperature detection portion (22) detecting the temperature level within the package (25) in which the magnetic detection portion (21) is disposed, the correction portion (23) correcting the temperature characteristic of the detection result of the magnetic detection portion (21) based on the detected temperature level, and the output portion (24) outputting temperature information indicating the detected temperature level. The energization control system (1) further includes the control unit (200) including the control portion (31) controlling the current flowing in the heating element (9) of the electrical apparatus (300) based on the temperature information.

According to the embodiments, the single sensor unit may measure the current flowing in the conductor, the current that is in accordance with the magnetic flux density detected by the magnetic detection sensor, and may measure the temperature within the package (25) in which the magnetic detection is provided. Accordingly, in a case where the current is equal to or greater than expected, the control unit may not only limit the current but also may limit the current in a case where the temperature increases excessively. Moreover, for example, in a case where the current flowing in the conductor is controlled by the switching element, because the energization control system controls the switching element based on the measurement results of the current value of the current flowing in the conductor and based on the temperature increase value, the energization control system may control the current by using a measurement result that has a small error. Accordingly, the capability of the switching element may be fully used.

According to the aforementioned embodiment, the conductor (2) corresponds to the plurality of bus bars electrically connecting the three-phase rotary electric machine (4) to a frequency converter (5) converting a frequency of at least one of an electric power inputted to the three-phase rotary electric machine (4) and the electric power outputted from the three-phase rotary electric machine (4). The heating element (9) corresponds to the plurality of switching elements of the frequency converter (5). in a case where the control portion (31) determines that the current value of the current flowing in each of the bus bars is constantly continued for a predetermined time, the control portion (31) specifies the bus bar flowing the current having the greatest current value among the current values of the currents flowing in each of the bus bars, the control portion (31) estimating the temperature increase value of the switching element controlling the current flowing in the specified bus bar based on the temperature information, the control portion (31) limiting the duty ratio of on-state of the switching element in a case where the estimated temperature increase value is equal to or greater than the preset temperature increase value.

According to the aforementioned embodiments, the switching element having the highest temperature increase may be specified, and the current flowing in the specified switching element may be controlled. Accordingly, the energization control system may prevent the over current from flowing in the switching element while fully using the capability of the switching element. Accordingly, the switching element of the frequency converter 5 may be prevented from being damaged.

According to the aforementioned embodiment, the conductor (2) is connected to the output terminal of the inductor (7) of the voltage converter (6) in series, the voltage converter (6) boosting and outputting a predetermined input voltage. The heating element corresponds to the switching element of the voltage converter (6). The control portion estimates the temperature increase value of the inductor (7) based on the temperature information, the control portion limiting the duty ratio of on-state ratio of the switching element in a case where the estimated temperature increase value is equal to or greater than the preset value.

Ideally, according to the boosting voltage converter 6, the current flowing in the inductor corresponds to the total amount of the current flowing in the switching element and the current flowing in the diode. According to the embodiment, because the current value of the current flowing in the switching element is determined in accordance with the temperature increase value of the inductor, the energization control system may prevent the overcurrent from flowing in the switching element while fully using the capability of the switching element of the voltage converter 6. Accordingly, the switching element of the voltage converter 6 may be prevented from being damaged.

According to the aforementioned embodiment, the control portion (31) estimates the temperature level of the heating element (9) based on the map illustrating the relationship between the prerecorded temperature information and the temperature increase value of the heating element (9) and based on the temperature information transmitted from the sensor unit (100), the control portion (31) controlling the operation of the heating element (9) based on the estimation result.

According to the embodiments, the control portion may precisely operate the estimation of the temperature of the heating element. Accordingly, the energization control system may prevent the heating element from being damaged while fully using the capability of the heating element.

According to the aforementioned embodiment, the control portion (31) controls the flow of the current generating the magnetic flux having the magnetic flux density that corresponds to the detection target of the sensor unit (100) outputting the temperature information when the temperature level, indicated by the temperature information, within the package (25) reaches the preset reference temperature level (T1).

Accordingly, the control portion (31) obtains a heat load status of the magnetic detection portion (21) and when the temperature level within the package (25) reaches the preset reference temperature (T1), the control portion (31) may reduce the heat load of the magnetic detection portion (21). Accordingly, the damage of the magnetic detection portion (21) may be prevented.

According to aforementioned embodiment, the sensor unit (100) includes the first output terminal (26) outputting the detection result of the magnetic detection portion (21) detecting the magnetic flux density of the magnetic flux being generated at the surrounding of the conductor (2) in which the current flows, the second output terminal (27) being used for the correction of the temperature characteristic of the detection result of the magnetic detection portion (21), the second output terminal outputting the detection result of the temperature detection portion (22) detecting the temperature level within the package (25) in which the magnetic detection portion (21) is disposed, and a pair of positive and negative power supply terminals (28, 29) energizing the magnetic detection portion (21) and the temperature detection portion (22).

According to the embodiments, the detection result of the temperature used for the correction of the temperature characteristics (the temperature characteristics of the magnetic detection portion) of the detection result of the magnetic detection portion may be used in addition to the use for the correction. Accordingly, in a case where the detection of the temperature corresponds to a desired usage in addition to, for example, the detection of the magnetic flux density, because the temperature sensor does not have to be separately provided, the energization control system may be provided with a low cost.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An energization control system, comprising:
a sensor unit including
a magnetic detection portion detecting a magnetic flux density of a magnetic flux generated at a surrounding of a conductor in response to a current flowing in the conductor of an electrical apparatus;
a temperature detection portion detecting a temperature level within a package in which the magnetic detection portion is disposed;
a correction portion correcting a temperature characteristic of a detection result of the magnetic detection portion based on the detected temperature level; and
an output portion outputting temperature information indicating the detected temperature level; and
a control unit including
a control portion controlling a current flowing in a heating element of the electrical apparatus based on the temperature information, wherein
the conductor corresponds to a plurality of bus bars electrically connecting a three-phase rotary electric machine to a frequency converter converting a frequency of at least one of an electric power inputted to the three-phase rotary electric machine and an electric power outputted from the three-phase rotary electric machine;
the heating element corresponds to a plurality of switching elements of the frequency converter;

in a case where the control portion determines that a current value of the current flowing in each of the bus bars is constantly continued for a predetermined time, the control portion specifies the bus bar flowing the current having a greatest current value among the current values of the currents flowing in each of the bus bars, the control portion estimating a temperature increase value of the switching element controlling the current flowing in the specified bus bar based on the temperature information, the control portion limiting a duty ratio of on-state of the switching element in a case where the estimated temperature increase value is equal to or greater than a preset temperature increase value.

2. The energization control system according to claim 1, wherein the conductor is connected to an output terminal of an inductor of a voltage converter in series, the voltage converter boosting and outputting a predetermined input voltage;

the heating element corresponds to a switching element of the voltage converter; and the control portion estimates a temperature increase value of the inductor based on the temperature information, the control portion limiting a duty ratio of on-state ratio of the switching element in a case where the estimated temperature increase value is equal to or greater than a preset value.

3. The energization control system according to claim 2, wherein the control portion estimates the temperature increase value of the heating element based on the detected temperature level and a map illustrating a relationship between a prerecorded temperature information and the temperature increase value of the heating element, the control portion controlling an operation of the heating element based on the estimated temperature increase value of the heating element.

4. The energization control system according to claim 2, wherein the control portion controls a flow of the current generating the magnetic flux having the magnetic flux density that corresponds to a detection target of the sensor unit outputting the temperature information when the temperature level, indicated by the temperature information, within the package reaches a preset reference temperature level.

5. The energization control system according to claim 1, wherein the control portion estimates a temperature increase value of the heating element based on the detected temperature level and a map illustrating a relationship between a prerecorded temperature information and the temperature increase value of the heating element, the control portion controlling an operation of the heating element based on the estimated temperature increase value of the heating element.

6. The energization control system according to claim 5, wherein the control portion controls a flow of the current generating the magnetic flux having the magnetic flux density that corresponds to a detection target of the sensor unit outputting the temperature information when the temperature level, indicated by the temperature information, within the package reaches a preset reference temperature level.

7. The energization control system according to claim 1, wherein the control portion controls a flow of the current generating the magnetic flux having the magnetic flux density that corresponds to a detection target of the sensor unit outputting the temperature information when the temperature level, indicated by the temperature information, within the package reaches a preset reference temperature level.

* * * * *